(12) United States Patent
Zhao et al.

(10) Patent No.: US 11,498,318 B2
(45) Date of Patent: Nov. 15, 2022

(54) CLASS-A COMPONENTS COMPRISING MOLDABLE CARBON FIBER

(71) Applicant: GM GLOBAL TECHNOLOGY OPERATIONS LLC, Detroit, MI (US)

(72) Inventors: Selina X. Zhao, Rochester Hills, MI (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/703,931

(22) Filed: Dec. 5, 2019

(65) Prior Publication Data

US 2021/0170730 A1 Jun. 10, 2021

(51) Int. Cl.
*B32B 27/12* (2006.01)
*B32B 5/02* (2006.01)
(Continued)

(52) U.S. Cl.
CPC .............. *B32B 27/12* (2013.01); *B29C 70/50* (2013.01); *B32B 3/266* (2013.01); *B32B 5/024* (2013.01);
(Continued)

(58) Field of Classification Search
CPC .................................................... B32B 27/12
See application file for complete search history.

(56) References Cited

U.S. PATENT DOCUMENTS 3,458,615 A 7/1969 Bragaw, Jr. et al.
3,459,615 A 8/1969 Ellerman
(Continued)

FOREIGN PATENT DOCUMENTS

CN 101270512 A 9/2008
CN 101544083 A 9/2009
(Continued)

OTHER PUBLICATIONS

First Office Action for German Patent Application No. 102017121837.8 dated Oct. 4, 2018 with correspondence dated Oct. 17, 2018 from Manitz, Finsterwald & Partner summarizing contents; 6 pages.
(Continued)

*Primary Examiner* — William P Watkins, III
(74) *Attorney, Agent, or Firm* — Harness, Dickey & Pierce, P.L.C.

(57) ABSTRACT

Class-A components (CAC) include a first and second skin layer each having a polymer matrix and a fiber reinforcing material embedded within the polymer matrix, a third layer disposed between the first and second skin layers and including a third polymer matrix and a filler material interspersed within the third polymer matrix, and a Class-A finish coat applied to the second skin layer. The fiber reinforcing materials include a plurality of substantially aligned carbon fibers and a plurality of low strength regions staggered throughout the carbon fibers. The CAC can be integrated with a rigid vehicle frame. The CAC can be a structural component. The CAC can be a door, a roof panel, or a hood. The CAC can include a layer of woven fibers between the Class-A finish coat and the second skin layer and a portion of the woven fibers can be visible through the Class-A surface layer.

20 Claims, 4 Drawing Sheets

(51) Int. Cl.

| | | |
|---|---|---|
| *B32B 5/26* | (2006.01) | |
| *B32B 27/20* | (2006.01) | |
| *B29C 70/50* | (2006.01) | |
| *B62D 29/04* | (2006.01) | |
| *B32B 3/26* | (2006.01) | |
| *B62D 25/10* | (2006.01) | |
| *B29L 31/30* | (2006.01) | |
| *B62D 25/06* | (2006.01) | |
| *B60J 5/00* | (2006.01) | |
| *B62D 25/04* | (2006.01) | |

(52) U.S. Cl.
CPC ............ *B32B 5/26* (2013.01); *B32B 27/20* (2013.01); *B62D 29/04* (2013.01); *B29L 2031/30* (2013.01); *B32B 2255/02* (2013.01); *B32B 2255/26* (2013.01); *B32B 2262/106* (2013.01); *B32B 2605/00* (2013.01); *B60J 5/00* (2013.01); *B62D 25/04* (2013.01); *B62D 25/06* (2013.01); *B62D 25/10* (2013.01)

(56) References Cited

U.S. PATENT DOCUMENTS

| | | | |
|---|---|---|---|
| 3,699,210 | A | 10/1972 | Binning et al. |
| 4,208,267 | A | 6/1980 | Diefendorf et al. |
| 4,672,705 | A | 6/1987 | Bors et al. |
| 4,737,383 | A | 4/1988 | Matsumae et al. |
| 5,017,423 | A | 5/1991 | Bossmann et al. |
| 5,024,818 | A | 6/1991 | Tibbetts et al. |
| 5,037,697 | A | 8/1991 | Fujisawa et al. |
| 5,194,212 | A | 3/1993 | Bonnett |
| 5,582,912 | A | 12/1996 | McCullough, Jr. et al. |
| 5,700,573 | A | 12/1997 | McCullough |
| 5,916,346 | A | 6/1999 | Neal |
| 6,638,883 | B2 | 10/2003 | Gaffney et al. |
| 8,191,215 | B2 | 6/2012 | Meyer |
| 8,309,644 | B1 | 11/2012 | Huang |
| 8,372,495 | B2 * | 2/2013 | Kenney ............... G06F 1/16 428/34.1 |
| 8,567,469 | B2 | 10/2013 | Meyer et al. |
| 8,568,549 | B2 | 10/2013 | Meyer et al. |
| 9,896,783 | B2 | 2/2018 | Kia |
| 9,920,454 | B2 | 3/2018 | Sutti et al. |
| 9,956,712 | B2 | 5/2018 | Lanzl et al. |
| 10,113,250 | B2 | 10/2018 | Kia |
| 10,138,579 | B2 | 11/2018 | Wang et al. |
| 10,358,767 | B2 | 7/2019 | Kia et al. |
| 10,427,349 | B2 | 10/2019 | Kia et al. |
| 10,612,163 | B2 | 4/2020 | Kia et al. |
| 10,916,370 | B2 | 2/2021 | Kubani et al. |
| 10,941,510 | B2 | 3/2021 | Kia et al. |
| 2003/0100239 | A1 | 5/2003 | Gaffney et al. |
| 2004/0089129 | A1 | 5/2004 | Toth |
| 2010/0028593 | A1 | 2/2010 | Taketa et al. |
| 2012/0213997 | A1 | 8/2012 | Wang et al. |
| 2013/0149523 | A1 | 6/2013 | Tsotsis |
| 2014/0083596 | A1 * | 3/2014 | Walker ............... B29C 44/12 156/78 |
| 2014/0264985 | A1 | 9/2014 | Sutti et al. |
| 2016/0090056 | A1 * | 3/2016 | Hundley ............... B60R 19/18 293/120 |
| 2016/0194468 | A1 | 7/2016 | Ogasawara et al. |
| 2017/0067185 | A1 | 3/2017 | Kia |
| 2017/0067186 | A1 | 3/2017 | Kia |
| 2017/0314668 | A1 | 11/2017 | Kia et al. |
| 2018/0016740 | A1 | 1/2018 | Kia et al. |
| 2018/0085991 | A1 * | 3/2018 | Kia ............... B29C 49/58 |
| 2019/0062955 | A1 | 2/2019 | Kia et al. |
| 2019/0062956 | A1 | 2/2019 | Wang et al. |
| 2019/0177893 | A1 | 6/2019 | Kia et al. |
| 2019/0276616 | A1 | 9/2019 | Kia et al. |

FOREIGN PATENT DOCUMENTS

| | | | |
|---|---|---|---|
| CN | 101600550 | A | 12/2009 |
| CN | 102965928 | A | 3/2013 |
| CN | 104024494 | A | 9/2014 |
| CN | 104441678 | A | 3/2015 |
| CN | 105793019 | A | 7/2016 |
| CN | 106521716 | A | 3/2017 |
| CN | 106521718 | A | 3/2017 |
| CN | 107618194 | A | 1/2018 |
| CN | 109423703 | A | 3/2019 |
| CN | 107866985 | B | 10/2020 |
| CN | 112918565 | A | 6/2021 |
| DE | 3540411 | A1 | 5/1987 |
| DE | 19944164 | A1 | 6/2000 |
| DE | 69628946 | T2 | 5/2004 |
| DE | 102007012607 | A1 | 9/2008 |
| DE | 102007012609 | A1 | 9/2008 |
| DE | 102007012608 | A1 | 10/2008 |
| DE | 102016116053 | A1 | 3/2017 |
| DE | 102016116662 | A1 | 3/2017 |
| DE | 102017115451 | A1 | 1/2018 |
| DE | 102017121837 | A1 | 3/2018 |
| DE | 102018120626 | A1 | 2/2019 |
| DE | 102020129065 | A1 | 6/2021 |
| EP | 2127840 | | 12/2009 |
| EP | 1305268 | B1 | 9/2010 |
| EP | 2679619 | A1 | 1/2014 |
| EP | 2862971 | A1 | 4/2015 |
| GB | 2373793 | A | 10/2002 |
| JP | H08325850 | A | 12/1996 |
| JP | 2001073230 | A | 3/2001 |
| JP | 2004345154 | A | 12/2004 |
| JP | 2013082229 | A | 5/2013 |
| WO | WO-2014100127 | A1 | 6/2014 |

OTHER PUBLICATIONS

First Office Action for Chinese Patent Application No. 201710846713.3 dated Jun. 27, 2019 with English language machine translation; 15 pages.

Second Office Action for Chinese Patent Application No. 201710846713.3 dated Mar. 11, 2020 with English language machine translation; 10 pages.

Cytec Industrial Materials, VTM® 264-1 & VTM®264S-1, PDS1268_07.13._Issue1a (Jul. 17, 2013); 3 pages.

Cytec Industries Inc., Safety Data Sheet for VTM® 264 Prepreg (Aug. 5, 2013); 9 pages.

"Hollow." Merriam Webster, www.merriam-webster.com/dictionary/hollow (2018); 2 pages.

Park, Soon-Jin, et al., "Precursors and Manufacturing of Carbon Fibers." Springer Series in Materials Science, vol. 210 (Oct. 9, 2014); pp. 31-66.

Polyacrylonitrile (PAN) Carbon Fibers Industrial Capability Assessment, OUSD (AT&L) Industrial Policy, U.S. Department of Defense (Oct. 2005); 23 pages.

Technical Data Sheet, "Polyacrylonitrile (PAN): how is it made?" Toray Carbon Fibers Europe, downloaded from http://www.toray-cfe.com/index.php/en/newsletter-v2/42-product/48-polyacrylonitrile-pan-how-is-it made (published on or before Aug. 14, 2015); 2 pages.

First Office Action for Chinese Patent Application No. 202011403710.0 dated Aug. 24, 2022, with with correspondence dated Aug. 26, 2022, from China Patent Agent (H.K.) Ltd. summarizing contents; 11 pages.

* cited by examiner

CLASS-A COMPONENTS COMPRISING MOLDABLE CARBON FIBER

INTRODUCTION

Carbon fibers are used as a light-weight reinforcement phase to make high-strength light-weight polymeric composite materials. The carbon fibers may be continuous filaments that may be thousands of micrometers (μm) or millimeters (mm) in length. A group of continuous carbon fibers are often categorized as a bundle of continuous carbon fiber filaments. Carbon fiber "tow" is usually designated as a number of filaments in thousands (designated by K after the respective tow number). Alternatively, carbon fiber bundles may be chopped or milled and thus form short segments of carbon fibers (filaments or bundles) typically having a mean fiber length between 50 μm (about 0.002 inches) and 50 mm (about 1.97 inches). While composites incorporating carbon fibers are all light-weight and high-strength, composites incorporating continuous carbon fiber filaments have especially high strength as compared to composites incorporating chopped or milled carbon fibers. By way of non-limiting example, a representative unidirectional continuous carbon fiber filament when incorporated into a composite provides an ultrahigh ultimate tensile strength of about 300 to 1,200 MPa, while composites with chopped carbon fibers have an ultimate tensile strength of about 80 MPa to 350 MPa.

Composite articles or components can be formed by using sheets or strips of a reinforcement material, such as a carbon fiber-based material having continuous carbon fibers. Polymer precursors, such as resins, can be impregnated in carbon fiber-based substrate material systems, known as pre-impregnating (referred to as "pre-preg") that involves wetting a resin into the carbon fiber-based substrate material in a first step, then optionally winding up the carbon fiber-based substrate material, and storing it for later use.

While the ultrahigh strengths associated with carbon-fiber composites are highly desirable in certain applications, one challenge in using continuous carbon fibers composite pre-pregs is the lack of flowability and formability, because composite pre-pregs incorporating continuous carbon fibers can be too stiff with high resistance to flow. Such inflexibility and rigidity can translate to poor moldability, making it difficult to form three-dimensional shapes from composites having continuous carbon fibers. Further, lack of flowability in the pre-preg material can result in warpage in the final composite product and issues with undesirable surface appearance. It would be desirable to form continuous carbon fiber pre-preg materials having higher flowability, and thus greater moldability, with the capability of readily forming complex and three-dimensionally shaped components with ultrahigh-strengths.

SUMMARY

Vehicles are provided, and include a vehicle body with a rigid frame, and a Class-A component (CAC) integrated with the rigid frame. The CAC can include a first skin layer having a first polymer matrix and a first fiber reinforcing material embedded within the first polymer matrix, a second skin layer defined by an outer surface and an inner surface oriented towards the first skin layer and having a second polymer matrix and a second fiber reinforcing material embedded within the second polymer matrix, a third layer disposed between the first and second skin layers and including a third polymer matrix and a filler material interspersed within the third polymer matrix, and a Class-A finish coat applied to the outer surface of the second skin layer forming a Class-A surface layer. The first fiber reinforcing material and the second fiber reinforcing material each include a plurality of substantially aligned carbon fibers defining a major axis and a second axis perpendicular to the major axis, and the plurality of substantially aligned carbon fibers have a plurality of low strength regions staggered with respect to the second axis. The CAC can be a structural component. The CAC can be a door. The CAC can be a roof panel. The CAC can be a hood. The CAC can further include a layer of woven fibers disposed between the Class-A finish coat and the second skin layer. The Class-A finish coat can be clear and at least a portion of the layer of woven fibers can be visible through the Class-A surface layer.

Class-A components (CAC) are provided and include a first skin layer having a first polymer matrix and a first fiber reinforcing material embedded within the first polymer matrix, a second skin layer defined by an outer surface and an inner surface oriented towards the first skin layer and having a second polymer matrix and a second fiber reinforcing material embedded within the second polymer matrix, a third layer disposed between the first and second skin layers and having a third polymer matrix and a filler material interspersed within the third polymer matrix, and a Class-A finish coat applied to the outer surface of the second skin layer forming a Class-A surface layer. The first fiber reinforcing material and the second fiber reinforcing material each include a plurality of substantially aligned carbon fibers defining a major axis and a second axis perpendicular to the major axis, and the plurality of substantially aligned carbon fibers have a plurality of low strength regions staggered with respect to the second axis. A low strength region can be a perforation in the carbon fiber. A low strength region can be a region with a thickness lower than the average thickness of the carbon fiber. A low strength region can be a region with a molecular or chemical structure that differs from the bulk of the carbon fiber. The third layer can be substantially free of fiber material. The CAC can further include a sheet molding compound (SMC) layer disposed between the outer surface of the second skin layer and the Class-A finish coat, and the SMC layer can include a polymer matrix imbedded with chopped fibers and the fibers can have an average length of about 10 mm to about 50 mm. The Class-A finish coat can include one or more of a polyurethane, an epoxy, a polyester, and a vinyl ester. The first skin layer can include about 20 v. % to about 75 v. % of the first fiber reinforcing material and the second skin layer can include about 20 v. % to about 75 v. % of the second fiber reinforcing material. The low strength regions of the first fiber reinforcing material can define a first set of high strength regions with an average length of about 5 mm to about 15 mm and a second set of high strength regions with an average length of about 20 mm to about 90 mm, and the low strength regions of the second fiber reinforcing material can define a third set of high strength regions with an average length of about 5 mm to about 15 mm and a fourth set of high strength regions with an average length of about 20 mm to about 90 mm. The filler material of the third layer can include hollow glass microspheres, silicon particles, wood particles, and calcium carbonate fragments. The filler material of the third layer can include one or more of hollow glass microspheres, and the third polymer matrix can include up to 50% by volume of the hollow glass microspheres. The first polymer matrix and the second polymer matrix can each include an epoxy, a polyurethane thermoset resin, or a nylon thermoplastic resin. The third polymer matrix can include an epoxy, a polyurethane thermoset resin, or a nylon thermoplastic resin.

Other objects, advantages and novel features of the exemplary embodiments will become more apparent from the following detailed description of exemplary embodiments and the accompanying drawings.

DRAWINGS

Corresponding reference numerals indicate corresponding parts throughout several views of the drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations. As used herein, "wt. %" refers to a percent by weight, and "v. %" refers to a percent by volume.

Carbon-fiber reinforced polymeric composites (CFRP) include a resin that is cured and/or solidified to form a polymeric matrix having a plurality of carbon fibers distributed therein as a reinforcement phase. As discussed above, CFRPs are often created from a pre-preg, where bundles of the carbon fibers are used in sheets that are impregnated with uncured or partially cured resin. A component or part can be formed by using the pre-preg to be laid-up on a mandrel or disposed in a mold, where it is then consolidated and cured/reacted to form the final component.

Figure 1:
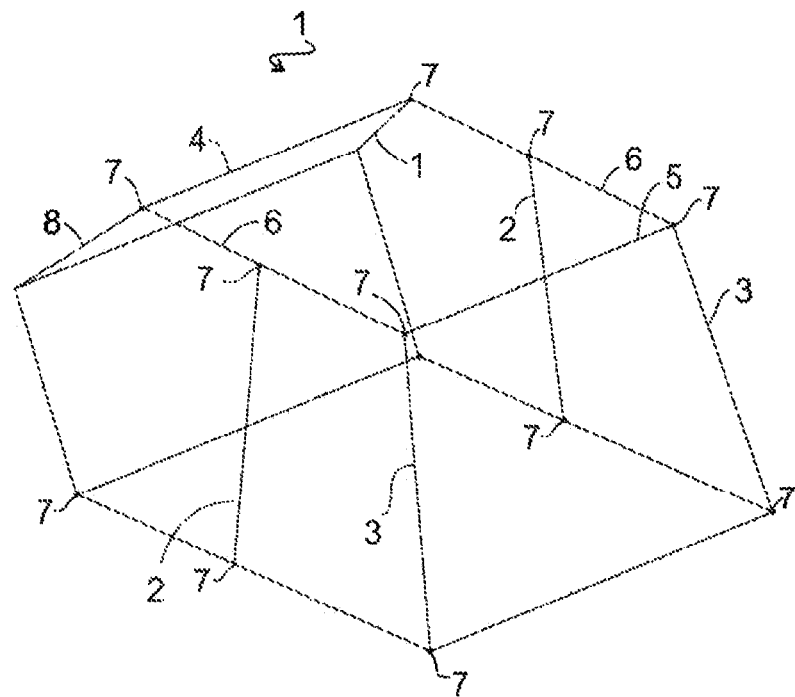
FIG. 1 illustrates a diagrammatic form of a vehicle rigid frame, according to one or more embodiments.
Figure 2:
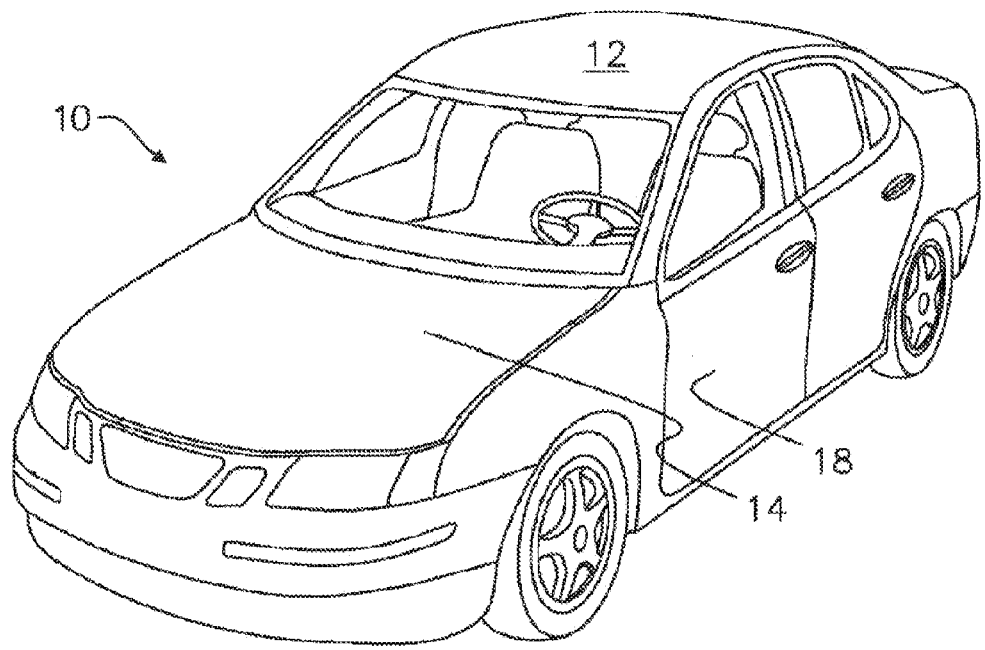
FIG. 2 illustrates a perspective view of a vehicle, according to one or more embodiments.

Provided herein are Class-A components ("CAC") comprising CFRPs, vehicles utilizing the same, and methods for manufacturing the same. A CAC is a component which has a surface which is visible without manipulating the component or the product (e.g., a vehicle) to which the component is integral. Vehicles can include any relevant vehicle platform, such as passenger vehicles (e.g., internal combustion engine, hybrid, full electric, fuel cell, fully or partially autonomous, etc.), commercial vehicles, industrial vehicles, tracked vehicles, off-road and all-terrain vehicles (ATV), farm equipment, boats, airplanes, etc. A vehicle can comprise a rigid frame with components (e.g., CACs) integrated therewith. For example, FIG. 1 illustrates a diagrammatic form of a vehicle rigid frame 1 defining a passenger compartment of a vehicle 10 (FIG. 2) and including structural components (e.g., A-pillars 8, B-pillars 2, C-pillars 3, front frame 4, rear frame 5, and side roof frames 6) connected at structural nodes 7. Regions between the structural components can define integration points for components such as window panes, doors, front hoods, trunks, front bumpers, and back bumpers, for example. FIG. 2 illustrates a perspective view of a vehicle 10 including a roof panel 12, a hood 14, and a door panel 18 integrated with a rigid frame (obscured), such as frame 1. Each of the roof panel 12, the hood 14, and the door panel 18 can be CACs comprising CFRPs, as will be described below. Further, CACs comprising CFRPs as disclosed herein can be at least semi-structural. A structural component integrated with a vehicle (e.g., vehicle 10) frame (e.g., frame 1) is one which improves the rigidity and overall mechanical performance of a vehicle. For example, a structural Class-A door, roof, and/or hood can be integrated with a vehicle frame to improve the crash performance of a vehicle. An at least semi-structural Class-A roof panel can reduce the number and/or strength and/or size of roof frame elements (e.g., front frame 4, rear frame 5, side roof frames 6, and other frame members disposed therebetween) necessary to provide a vehicle 10 with suitable structural characteristics, for example.

Figure 3A:
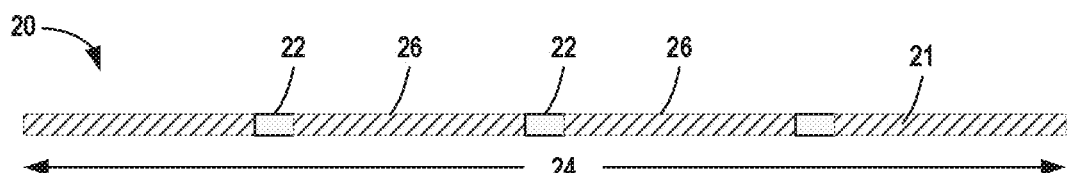
FIG. 3A illustrates a side view of a carbon fiber, according to one or more embodiments.

FIG. 3A illustrates a side view of a carbon fiber 20 including a body 21 having a plurality of low strength regions 22 dispersed within high strength regions 26 of the body 21. A low strength region 22 is a region that is either perforated or preferentially fractures or breaks when stress is applied as compared to the remainder of the body 21. For example a low strength region 22 can have a strength (e.g., an ultimate tensile strength) that is at least about 50% less than a comparative ultimate tensile strength of a remainder of the carbon fiber 20, optionally at least about 60%, optionally at least about 70%, optionally at least about 80%, and in certain aspects, optionally at least about 90% less than a comparative strength of the high strength regions of the remainder of the body of the carbon fiber. Accordingly, a low strength region 22 can be one which is mechanically and/or chemically differentiated from the high strength regions 26 of the body 21. A low strength region 22 which is a perforation can be a pre-cut or preformed termination point in a carbon fiber 20. A low strength region 22 can comprise a region with a thickness lower than the average thickness of the carbon fiber 20. A low strength region 22 can comprise a region with a molecular or chemical structure that differs from the bulk of the carbon fiber 20. Introduction of these low strength regions 22 enables formation of carbon-fiber polymeric composites having high strength and low resistivity to flow, thus being more malleable and moldable.

Figure 3B:
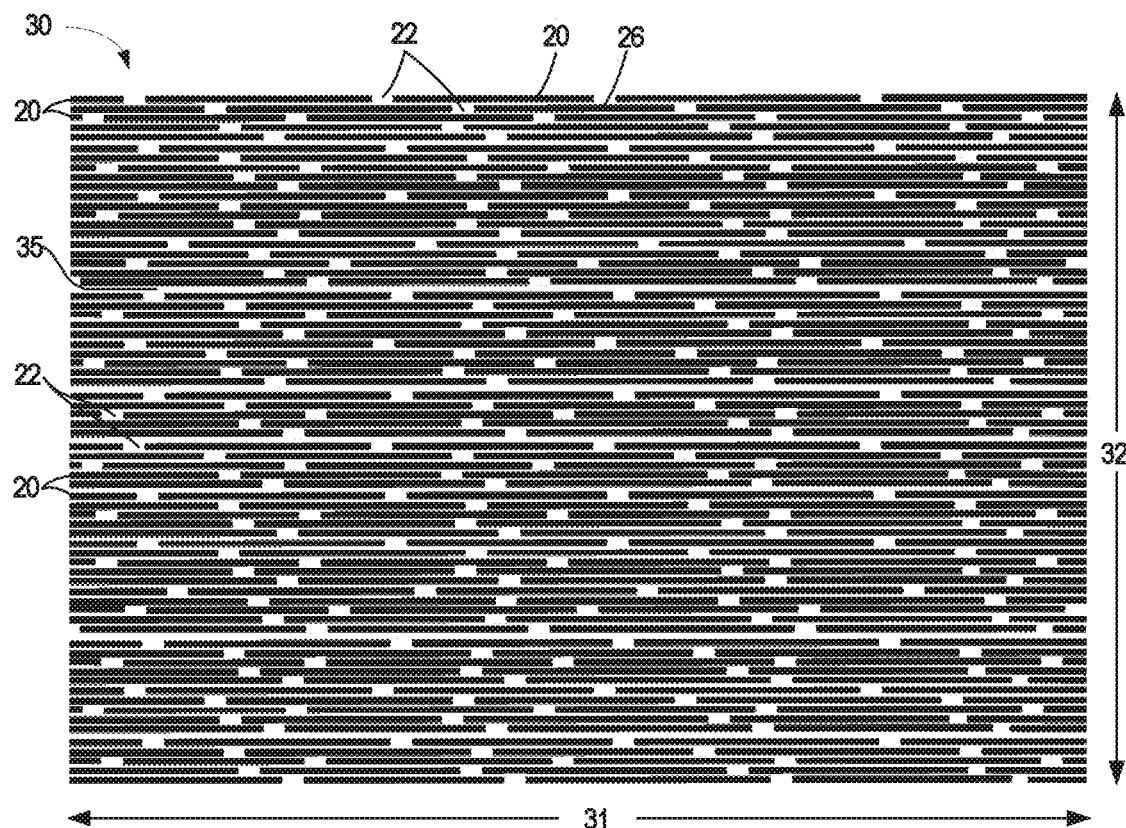
FIG. 3B illustrates a top view of a moldable carbon fiber pre-impregnated composite precursor material, according to one or more embodiments.
Figure 4:
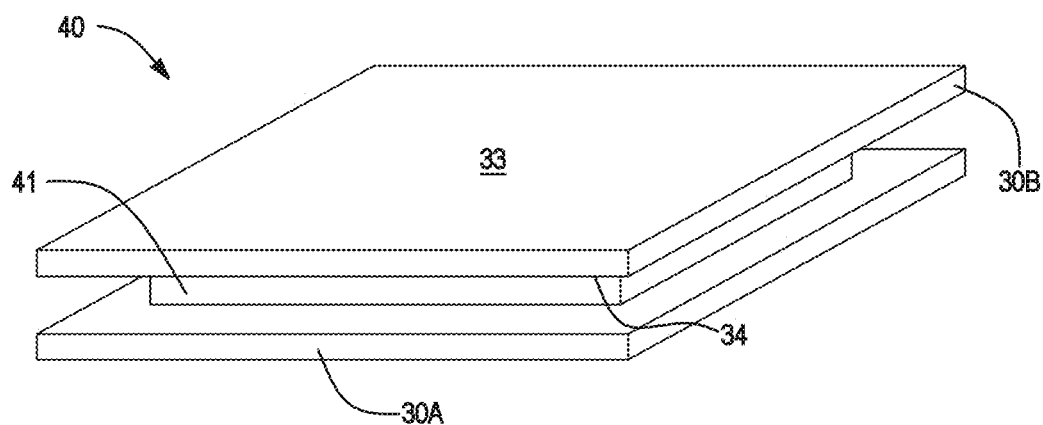
FIG. 4 illustrates a perspective view of a layered molding precursor, according to one or more embodiments.

FIG. 3B illustrates a top view of a moldable carbon fiber pre-impregnated composite precursor material ("pre-preg") 30 suitable for forming the first skin layer 30A or the second skin layer 30B (FIG. 4). Pre-preg 30 comprises a plurality of carbon fibers 20 and a polymeric matrix 35 distributed within and around the carbon fibers 20. The plurality of carbon fibers 20 are substantially aligned and generally define a major axis or length 31 and a second axis or width 32 perpendicular to the major axis. The carbon fibers 20 can have a plurality of low strength regions 22 staggered at regular or irregular intervals along both the length 31 and width 32 of the pre-preg 30. The plurality of substantially aligned carbon fibers 20 forming the fiber reinforcing material of the first and second skin layers 30A, 30B can have an average density of about 100-100,000 perforations per square meter of the fiber sheet, in some embodiments. Carbon fibers 20 in a pre-preg 30 can have an average thickness of about 0.1 mm to about 1 mm, for example. Carbon fibers 20 in a pre-preg 30 can have an average length exceeding a pre-determined critical length, or the length at which the fiber-matrix shear load matches the fiber fracture load. The critical length is accordingly the minimum length required for effective stress transfer from the matrix to the fiber. In some embodiments, the low strength regions 22 can define a first set of high strength regions 26 with an average length of about 5 mm to about 15 mm, and a second set of high strength regions 26 with an average length of about 20 mm to about 90 mm. The first set of high strength regions 26 can comprise about 20 wt. % to about 80 wt. % of the carbon fibers 20 in the pre-preg 30, and the second set of high strength regions 26 can comprise about 20 wt. % to about 80 wt. % of the carbon fibers 20 in the pre-preg 30, for example.

The polymeric matrix 35 can comprise a thermoset polymer (e.g., a thermoset resin matrix, epoxy, polyurethane, polyester resins) or thermoplastic polymer matrix (e.g., a thermoplastic resin, nylon, polyolefin, acrylic resin). A thermoset resin can include an unsaturated polyester resin, an uncured epoxy resin, or a vinyl ester resin. A thermoplastic resin can include a polyphenylene sulfide (PPS), a polyether ether ketone (PEEK), a polyether imide (PEI), a polyether ketone ketone (PEKK), a polyether sulfone (PES), and/or a polyether ketone ketone-fc (PEKK-FC), for example. In some embodiments, the polymeric matrix 35 can comprise one or more of an epoxy, a polyurethane thermoset resin, and a nylon thermoplastic resin.

The low strength regions 22 may define a plurality of discrete potential termination points across the length 31 of the carbon fibers 20. The termination points may be staggered with respect to the second axis. The carbon fibers 20 are capable of breaking at the low strength regions 22 when bent, folded, or otherwise stressed (e.g., during molding processes described below) while not permitting stress and fracture propagation across the width 32 or length 31. When formed into a CAC, the existence of staggered discontinuous or low strength regions 22 in the pre-preg 30 serves to maintains the strength of the CAC to near the strength levels provided by high strength continuous carbon fibers while allowing for stress loads to be transferred from a low strength region 22 to one or more high strength regions 26 of adjacent carbon fiber(s) 20. For example, a pre-preg 30 prepared in accordance with certain aspects of the present disclosure still has an ultrahigh strength, for example, an ultimate tensile strength of greater than or equal to about 500 MPa, optionally greater than or equal to about 1,000 MPa, or optionally greater than or equal to about 1,500 MPa. The pre-preg 30 can comprise about 20 v. % to about 75 v. % substantially aligned carbon fibers 20 and about 25 v. % to about 80 v. % polymer matrix.

FIG. 4 illustrates a perspective view of a layered molding precursor 40 suitable forming CACs as described herein. The molding precursor 40 comprises a first skin layer 30A, a second skin layer 30B, and a third light-weighting layer 41 disposed between the first skin layer 30A and the second skin layer 30B. Each of the first skin layer 30A and the second skin layer 30B can comprise a pre-preg 30 as described above. The second skin layer 30B can be defined by an outer surface 33 and an inner surface 34 oriented towards the first skin layer 30A as shown. Optionally, the molding precursor can comprise a sheet molding compound (SMC) layer or a layer of woven fibers disposed on the outer surface 33 of the second skin layer 30B, as will be described below.

The third light-weighting layer 41 comprises filler material interspersed in a third polymer matrix. The third polymer matrix can include the same materials suitable for the first polymer matrix and the second polymer matrix, as described above. In one embodiment, the third polymer matrix can comprise an organic bisphenol A diglycidyl ether (DGEBA) liquid epoxy resin that is a reaction product of epichlorohydrin and bisphenol A, with an optional methyltetrahydrophthalic anhydride (MTHPA) curing agent supplemented with an optional silicone-free, polymer-based air release additive. Filler material is added to reduce weight and improve performance characteristics of the CAC, and can include hollow glass microspheres, silicon particles, wood particles, calcium carbonate fragments, and optionally chemical and/or physical foaming agents. For example, silicon particles can be added to manipulate the viscosity of the pre-preg 30, and glass microspheres can be used to reduce the density (e.g., reduce the overall density of the layer by at least about 10%). Chemical thickening agents/ short chain polymer structures can added to manipulate the viscosity by b-staging the third layer, in some embodiments. The hollow glass microspheres microspheres can have an average diameter of about 10 μm to about 100 μm, in some embodiments. In some embodiments, the third light-weighting layer 41 is substantially free of chopped fiber material (i.e., comprises less than about 1 v. % collectively of chopped fibers and/or carbon fibers 20).

Figure 5:
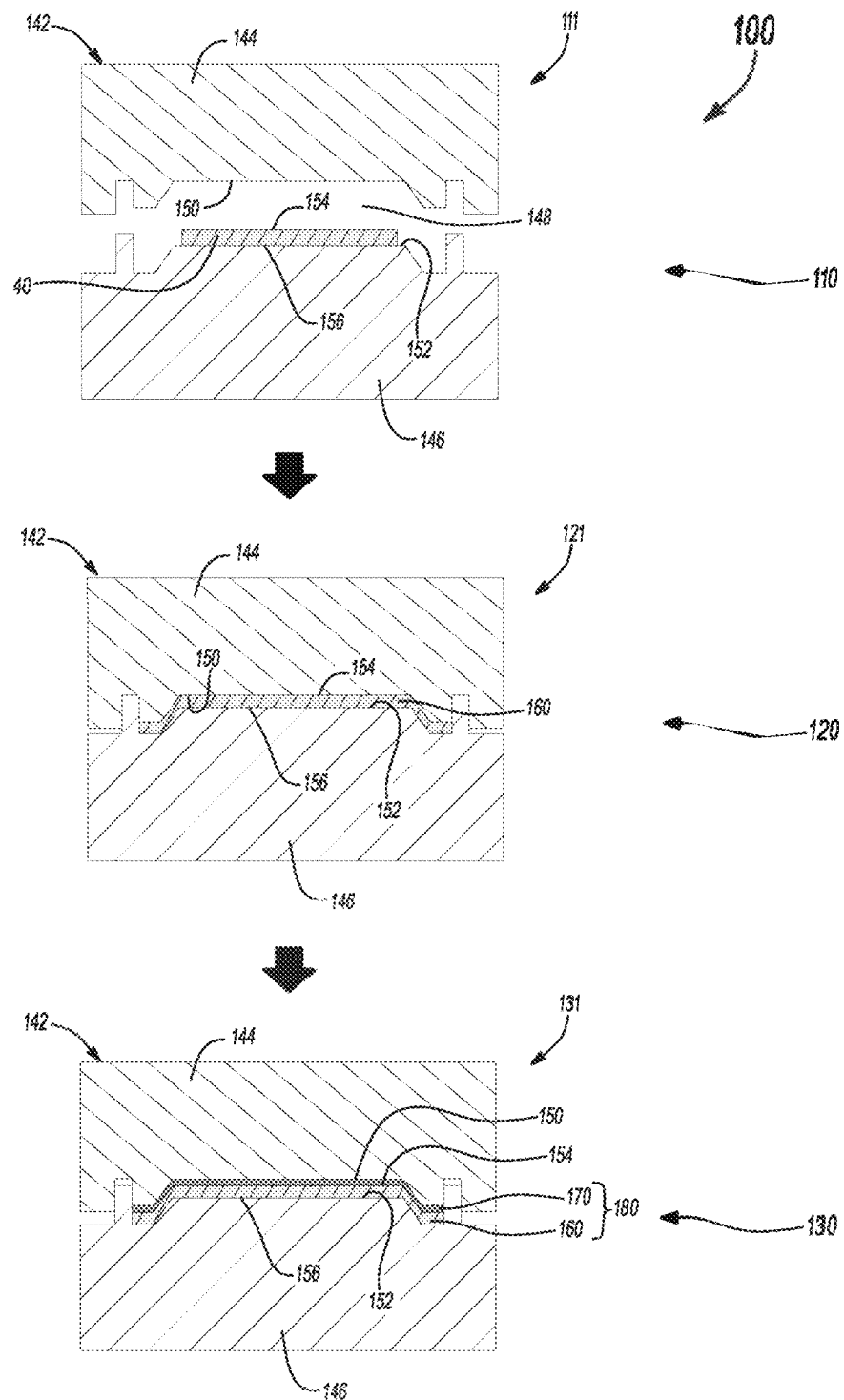
FIG. 5 illustrates a schematic of a method for forming a Class-A component and manufacturing a vehicle including a Class-A component, according to one or more embodiments.

FIG. 5 illustrates method 100 for forming a CAC 180, comprising disposing 110 a molding precursor 40 within a die 142 and compression molding 120 the molding precursor 40 in the die 142. The first skin layer 30A, the second skin layer 30B, and the third light-weighting layer 41 have first, second and third rheological flow properties, respectively, that are substantially similar such that the first skin 30A layer, the second skin layer 30B, and the third light-weighting layer 41 flow generally in unison at a predetermined compression molding 120 pressures. The die 142 includes a punch 144 and a block 146. In an open position 111, the die 142 has a cavity 148 defined by an upper surface 150 of the punch 144 and a lower surface 152 of the block 146. The molding precursor 40 can be disposed 110 within the die such that a bottom surface 156 of the molding precursor 40 (e.g., defined by the first skin layer 30A) is contiguous with the lower surface 152 of the block 146. During compression molding 120 the die 142 is disposed in a closed or compressing position 121 such that the upper surface 150 of the punch 144 contacts an upper surface 154 (e.g., defined by the outer surface 33 of second skin layer 30B, or the optional layer of woven fibers) of the molding precursor 40 and the lower surface 152 of the block 146 contacts the bottom surface of the molding precursor.

During compression molding 120, the cavity 148 and/or the die 142 generally can be at or heated to a temperature of about 50° C. to about 250° C., or about 100° C. to about 175° C. The die 142 can exert a pressure of about 0.5 MPa to about 20 MPa, or about optionally 5 MPa to about 15 MPa on the molding precursor 40. The application of heat and pressure to the moldable carbon fiber precursor material may cause the moldable carbon fiber precursor material to cross-link or solidify, thereby forming a structural component. The duration of this process may be greater than or equal to about 1 minute and less than or equal to about 10 minutes, optionally about 3 minutes, by way of example. Compression molding 120 forms a compression-molded molding precursor 160 which has a surface area greater than the molding precursor 40. For example, compression-molded molding precursor 160 (and the subsequently formed CAC 180 formed via method 100) can have a surface area at least 40% greater, at least 15% greater, or at least 3% greater than the molding precursor 40. In some embodiments, CAC 180 formed via method 100 can have a surface area that is about 40% to about 80% greater, about 15% to about 30% greater, or about 3% to about 15% greater than the molding precursor 40.

Method 100 further comprises, subsequent to compression molding 120, opening the die 142 to a partially-open position 131 to create a gap between upper surface 150 of the punch 144 and the upper surface 154 of the molding precursor 40 (e.g., the outer surface 33 of the second skin layer 30B) and injecting 130 a Class-A finish coat precursor 170 into the gap to create a class-A surface layer 171 (FIGS. 6A-B) on the compression-molded molding precursor 160 and form the CAC 180. In some embodiments, the gap between the upper surface 150 of the punch 144 and the upper surface 154 of the molding precursor 40 defines the geometry of the Class-A surface layer (i.e., the Class-A finish coat precursor 170 substantially fills the entire gap). In other embodiments, the gap is larger than the desired thickness of the Class-A surface layer (i.e., the gap is sufficiently wide such that the upper surface 150 of the punch 144 does not contact the injected 130 formed Class-A finish coat precursor 170).

Injecting 130 can further include curing or otherwise solidifying the Class-A finish coat precursor 170. The Class-A finish coat precursor 170 can be any clear-curing material ideally with high UV resistance and low viscosity during injection. For example, the Class-A finish coat precursor 170 can comprise one or more of a polyurethane, an epoxy, a polyester, or a vinyl ester. Method 100 can optionally include removing the CAC from the die 142 and painting the Class-A surface layer. In such embodiments, the Class-A finish coat precursor 170 can further comprise conductive carbon (e.g., carbon black, graphene) to increase the electronic conductivity of the CAC 180 surface for electrostatic paint coating. The Class-A finish coat precursor 170 can comprise about 1 wt. % to about 20 wt. %, or about 5 wt. % to about 10 wt. % conductive carbon, for example. In some embodiments, as an alternative to injection 130, the Class-A finish coat precursor 170 can be spray coated, dip coated, or compression molded 120 simultaneously with the molding precursor 160.

The use of a layered molding materials in method 100 can provide increased strength when compared to a molding material including only a single moldable carbon fiber precursor material, without sacrificing moldability and flowability. Method 100 can further advantageously be utilized to eliminate sanding/polishing/painting steps commonly conducted in the manufacture of CACs. For example, method 100 can be a method for manufacturing a vehicle and further include integrating the CAC 180 with a rigid vehicle frame (e.g., frame 1 of vehicle 10).

Figure 6A:
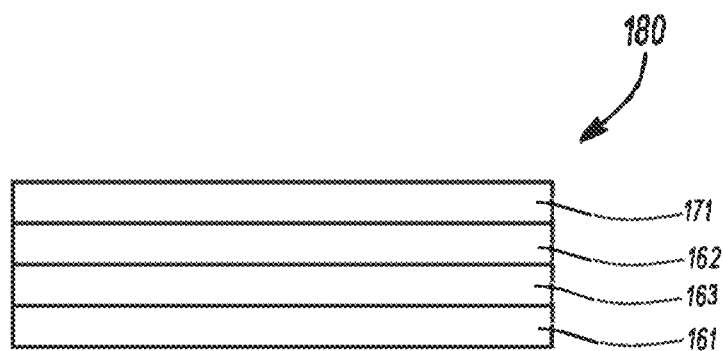
FIG. 6A illustrates a cross-sectional side view of a Class-A component, according to one or more embodiments.
Figure 6B:
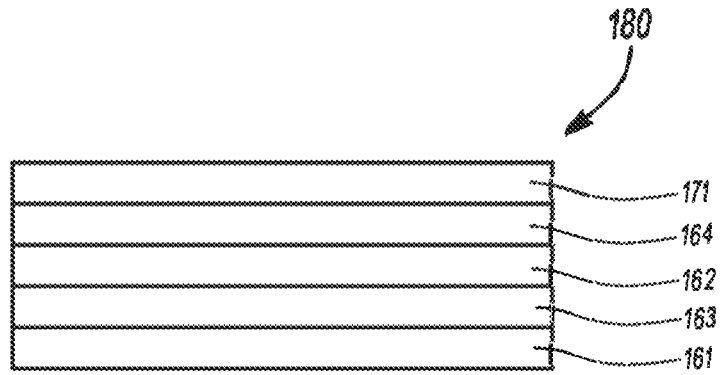
FIG. 6B illustrates a cross-sectional side view of a Class-A component, according to one or more embodiments.

As shown in FIG. 6A, method 100 accordingly yields a CAC 180 with a first cured skin layer 161 (e.g., formed from first skin layer 30A), a second cured skin layer 162 (e.g., formed from second skin layer 30B), a light-weighting layer 163 (e.g., formed from light-weighting layer 41), and a Class-A surface layer 171 (e.g., formed from the Class-A finish coat precursor 170). The first cured skin layer 161 can have a thickness of about 0.1 mm to about 5 mm, the second cured skin layer 162 can have a thickness of about 0.1 mm to about 5 mm, and the light-weighting layer 163 can have a thickness of about 0.1 mm to about 10 mm, in some embodiments. The FIG. 6B illustrates a CAC formed via method 100 which additionally comprises an accessory layer 164 between the second cured skin layer 162 and the Class-A surface layer 171. As discussed above, the accessory layer 161 can comprise a layer of woven fibers (e.g., carbon fibers, glass fibers, aramid fibers, and basalt fibers). The layer of woven fibers can be included for structural and/or aesthetic purposes. Specifically, an accessory layer 164 comprising a layer of woven fibers can be visible through the Class-A surface layer 171.

In other embodiments, the accessory layer 164 of CAC 180 can comprise a SMC layer comprising a thermoplastic polymer or thermosetting polymer matrix (e.g., such as those suitable for the first skin layer and second skin layer, as described above) imbedded with chopped fibers (e.g., carbon fibers, glass fibers, aramid fibers, and basalt fibers). The fibers can have an average length of about 10 mm to about 50 mm, for example. The SMC layer can comprise about 10 v. % to about 70 v. %, or about 30 v. % to about 60 v. % chopped fibers and about 90 v. % to about 30 v. %, or about 70 v. % to about 40 v. % polymer matrix, for example. CACs comprising SMC accessory layers 164 can be formed by applying the accessory layer 164 and the Class-A surface layer 171 outside of the die 142, for example.

In certain aspects, the present technology contemplates structural components manufactured according to the above methods or any others contemplated by those skilled in the art. The structural components may include a moldable carbon fiber precursor material having a plurality of substantially aligned carbon fibers defining a major axis and a second axis perpendicular to the major axis. The plurality of substantially aligned carbon fibers may have a plurality of discrete termination points staggered with respect to the second axis. Moldable carbon fiber precursor materials used in accordance with the present disclosure avoid separation of the resin and fibers and thus avoid or minimize warpage. Thus, composites formed from the carbon fiber precursor materials of the present disclosure exhibit improved surface quality of unpainted panels, by avoiding fiber distortion around curvatures during the molding process. Additionally, composites formed from the moldable carbon fiber precursor materials do not suffer loss of mechanical properties.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that cannot be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a vehicle body with a rigid frame; and
a Class-A component (CAC) integrated with the rigid frame, wherein the CAC includes:
a first skin layer comprising a first polymer matrix and a first fiber reinforcing material embedded within the first polymer matrix, the first skin layer having a first thickness of greater than or equal to about 0.1 mm to less than or equal to about 5 mm,
a second skin layer comprising a second polymer matrix and a second fiber reinforcing material embedded within the second polymer matrix, and defined by an outer surface and an inner surface oriented towards the first skin layer, the second skin layer having a second thickness of greater than or equal to about 0.1 mm to less than or equal to about 5 mm,
a third layer disposed between the first and second skin layers and comprising a third polymer matrix and a filler material interspersed within the third polymer matrix, the third layer having a third thickness of greater than or equal to about 0.1 mm to less than or equal to about 10 mm,
a Class-A finish coat applied to the outer surface of the second skin layer forming a Class-A surface layer, and
a fourth layer disposed between the Class-A finish coat and the second skin layer, the fourth layer comprising woven fibers or a sheet molding compound (SMC),
wherein the first fiber reinforcing material and the second fiber reinforcing material each comprise a plurality of substantially aligned carbon fibers defining a major axis and a second axis perpendicular to the major axis, and the plurality of substantially aligned carbon fibers comprise a plurality of low strength regions staggered with respect to the second axis.

2. The vehicle of claim 1, wherein the CAC is a structural component.

3. The vehicle of claim 1, wherein the CAC is a door.

4. The vehicle of claim 1, wherein the CAC is a roof panel.

5. The vehicle of claim 1, wherein the CAC is a hood.

6. The vehicle of claim 1, wherein the fourth layer comprises the woven fibers.

7. The vehicle of claim 6, wherein the Class-A finish coat is clear and at least a portion of the woven fibers is visible through the Class-A surface layer.

8. A Class-A component (CAC) comprising:
a first skin layer comprising a first polymer matrix and a first fiber reinforcing material embedded within the first polymer matrix, the first skin layer having a first thickness of greater than or equal to about 0.1 mm to less than or equal to about 5 mm,
a second skin layer comprising a second polymer matrix and a second fiber reinforcing material embedded within the second polymer matrix, and defined by an outer surface and an inner surface oriented towards the first skin layer, the second skin layer having a second thickness of greater than or equal to about 0.1 mm to less than or equal to about 5 mm,
a third layer disposed between the first and second skin layers and comprising a third polymer matrix and a filler material interspersed within the third polymer matrix, the third layer having a third thickness of greater than or equal to about 0.1 mm to less than or equal to about 10 mm,
a Class-A finish coat applied to the outer surface of the second skin layer forming a Class-A surface layer, and
a fourth layer disposed between the Class-A finish coat and the second skin layer, the fourth layer comprising woven fibers or a sheet molding compound (SMC),
wherein the first fiber reinforcing material and the second fiber reinforcing material each comprise a plurality of substantially aligned carbon fibers defining a major axis and a second axis perpendicular to the major axis, and the plurality of substantially aligned carbon fibers comprise a plurality of low strength regions staggered with respect to the second axis.

9. The CAC of claim 8, wherein a low strength region comprises a perforation in the carbon fiber.

10. The CAC of claim 8, wherein a low strength region comprises a region with a thickness lower than the average thickness of the carbon fiber.

11. The CAC of claim 8, wherein a low strength region comprises a region with a molecular or chemical structure that differs from the bulk of the carbon fiber.

12. The CAC of claim 8, wherein the third layer is substantially free of fiber material.

13. The CAC of claim 8, wherein the fourth layer comprises the SMC, the SMC comprising a polymer matrix imbedded with chopped fibers and the fibers having an average length of about 10 mm to about 50 mm.

14. The CAC of claim 8, wherein the Class-A finish coat comprises one or more of a polyurethane, an epoxy, a polyester, and a vinyl ester.

15. The CAC of claim 8, wherein the first skin layer comprises about 20 v. % to about 75 v. % of the first fiber reinforcing material and the second skin layer comprises about 20 v. % to about 75 v. % of the second fiber reinforcing material.

16. The CAC of claim 15, wherein the low strength regions of the first fiber reinforcing material define a first set of high strength regions with an average length of about 5 mm to about 15 mm and a second set of high strength regions with an average length of about 20 mm to about 90 mm, and the low strength regions of the second fiber reinforcing material define a third set of high strength regions with an average length of about 5 mm to about 15 mm and a fourth set of high strength regions with an average length of about 20 mm to about 90 mm.

17. The CAC of claim 8, wherein the filler material of the third layer includes hollow glass microspheres, silicon particles, wood particles, and calcium carbonate fragments.

18. The CAC of claim 8, wherein the filler material of the third layer includes one or more of hollow glass microspheres, and the third polymer matrix includes up to 50% by volume of the hollow glass microspheres.

19. The CAC of claim 8, wherein the first polymer matrix and the second polymer matrix each comprise an epoxy, a polyurethane thermoset resin, or a nylon thermoplastic resin.

20. The CAC of claim 8, wherein the third polymer matrix comprises an epoxy, a polyurethane thermoset resin, or a nylon thermoplastic resin.

* * * * *